(12) United States Patent (10) Patent No.: US 9,247,271 B2
Guillemot et al. (45) Date of Patent: Jan. 26, 2016

(54) METHOD AND DEVICE FOR MOTION INFORMATION PREDICTION IN MULTI-VIEW VIDEO CODING

(71) Applicants: INRIA INSTITUT NATIONAL DE RECHERCHE EN INFORMATIQUE ET EN AUTOMATIQUE, Le Chesnay (FR); CENTRE NATIONAL DE LA RECHERCHE SCIENTIFIQUE (C.N.R.S), Paris (FR)

(72) Inventors: Christine Guillemot, Chantepie (FR); Laurent Guillo, La Meziere (FR); Thomas Guionnet, Rennes (FR)

(*) Notice: Subject to any disclaimer, the term of this patent is extended or adjusted under 35 U.S.C. 154(b) by 460 days.

(21) Appl. No.: 13/647,253

(22) Filed: Oct. 8, 2012

(65) Prior Publication Data

US 2014/0098878 A1 Apr. 10, 2014

(51) Int. Cl.
*H04N 7/12* (2006.01)
*H04N 19/91* (2014.01)
*H04N 19/597* (2014.01)
*H04N 19/52* (2014.01)

(52) U.S. Cl.
CPC ............... *H04N 19/91* (2014.11); *H04N 19/52* (2014.11); *H04N 19/597* (2014.11)

(58) Field of Classification Search
CPC ...... H04N 19/52; H04N 19/597; H04N 19/91
USPC ........................................ 375/240.16, 240.12
See application file for complete search history.

(56) References Cited

U.S. PATENT DOCUMENTS

| 2011/0026598 | A1* | 2/2011 | Takada | .................. | H04N 19/56 375/240.16 |
| 2011/0317759 | A1* | 12/2011 | Thomas | ............... | H04N 19/172 375/240.12 |
| 2012/0093226 | A1* | 4/2012 | Chien | .................. | H04N 19/105 375/240.16 |
| 2013/0242046 | A1* | 9/2013 | ZHANG | ............ | H04N 13/0048 348/43 |
| 2014/0205014 | A1* | 7/2014 | Nakamura | ........... | H04N 19/105 375/240.16 |

* cited by examiner

*Primary Examiner* — Jessica M Prince (57) ABSTRACT

The invention concerns a method for encoding a video stream, an associated method for decoding a video stream, an associated encoder, an associated decoder and associated computer programs. The encoding method is directed to encoding a video stream comprising at least one video sequence, comprising, for the encoding of a square or rectangular block of a picture of a video sequence of the video stream, selecting a motion information predictor for the block from a list of candidate motion information predictors, and entropic encoding of an index representative of a position of the selected motion information predictor in the list.

19 Claims, 7 Drawing Sheets

METHOD AND DEVICE FOR MOTION INFORMATION PREDICTION IN MULTI-VIEW VIDEO CODING

TECHNICAL FIELD

The invention relates to digital video coding, and more particularly to the encoding and decoding of multi-view video streams, which comprise a plurality of video sequences of a same scene, captured simultaneously from multiple cameras.

BACKGROUND OF THE INVENTION

Digital video coding is an active field of research and standardization, since digital video is used in many consumer appliances such as laptop or desktop computers, digital cameras, digital recording devices, tablet computers.

In order to efficiently store and transmit digital video data, the digital video data is compressed.

Various compression standards have been developed, and the most recent one, the High Efficiency Video Coding (HEVC), which is presently under development, reaches higher compression efficiency than previous standards, and can be applied for very large picture resolutions.

Similarly to other compression methods, HEVC uses spatial and temporal prediction to reduce the redundancy of the video data and to achieve compression. The spatial prediction consists in predicting picture portions from other portions of the same picture, at the same temporal instant of the video. The temporal prediction consists in predicting a portion of a picture of the video from a portion of another picture of the video sequence, pointed at by a motion vector. The temporal prediction is also called inter prediction.

HEVC has an aim of further improving compression that is achieved by using hierarchical coding units, the basic unit used for carrying information related to prediction processes, called prediction unit, being of variable size and shape (either rectangular or square, with a variable size as from 4×4 to 64×64 pixels), so as to better take into account the content of a video sequence.

Moreover, HEVC proposes mechanisms to further increase the compression by reducing the bitrate of motion information to be transmitted. To this end, in the inter prediction modes, in particular the modes called "merge" and "skip", the motion information associated to a prediction unit is predicted from a candidate list. The candidate list includes motion information of already processed neighbouring prediction units of a prediction unit to be encoded, either in a spatial neighbourhood of the prediction unit to be encoded or in a temporal neighbourhood of the prediction unit to be encoded. The candidate list being predetermined, only an index indicating the position of the best suited motion information predictor for the motion information of the current prediction unit to be encoded is actually encoded and transmitted to the decoder. The encoding chosen is a specific entropic encoding called context-adaptive binary arithmetic coding (CABAC) which adapts a probability model used by an arithmetic encoder according to a local context. The entropic encoding using CABAC, as applied in HEVC, brings a particular advantage in terms of compression enhancement if the candidate list is ordered according to the relevancy of the candidate motion information predictors, the first candidate in the list being the most relevant.

The standard HEVC is dedicated to mono-view video compression, since it is adapted to compress a video stream comprising a single video sequence. An extension of HEVC standard, currently under development, is directed to the compression of multi-view video streams, which comprise N video sequences, with N at least equal to two, captured simultaneously, typically by N cameras which are positioned at different spatial positions. The views are rectified, therefore the cameras are assumed to be aligned. A block of a picture in a first view corresponds to a block displaced on the horizontal axis of a second view, the displacement depending on the distance between the cameras. Several applications can be envisaged for the multi-view video coding, also called 3D video coding, such as stereoscopic television and multi-view 3D television.

In order to take advantage of the potential redundancy offered by the presence of multiple views, a disparity compensated prediction mode has been added to the HEVC inter prediction modes. The disparity compensation refers to motion compensation between prediction units of sequences corresponding to different views: a prediction unit of a current view has a disparity motion vector pointing to a portion of a reference picture of a different view. Further, the list of candidates for motion information prediction comprises, for a current prediction unit to be encoded, the motion information associated to the prediction unit of another view corresponding to the current prediction unit.

There is still a need to improve compression, both in mono-view video coding and in multi-view video coding.

BRIEF SUMMARY OF THE INVENTION

To this end, the invention proposes, according to a first aspect, a method of encoding a video stream comprising at least one video sequence, comprising, for the encoding of a square or rectangular block of a picture of a video sequence of the video stream selecting a motion information predictor for said block from a list of candidate motion information predictors, and entropic encoding of an index representative of a position of the selected motion information predictor in said list.

The method further comprises:
computing statistics representative of a frequency of selection of each motion information predictor of said list on a first portion of a current video sequence,
for a current block to encode of a second portion following said first portion of the current video sequence, selecting a current motion information predictor for said current block, and entropic encoding of an item of information representative of said selected current motion information predictor, said item of information and/or said entropic encoding being dependent on said computed statistics.

Advantageously, the video contents are taken into account via the statistics computed, allowing a better adaptation of the entropic encoding to the local contents of a video. The compression achieved is therefore improved.

The encoding method according to the invention may also have one or more of the features below, considered independently or in combination:

the method further comprises a step of re-ordering said list of candidate motion information predictors, called initial list, to obtain a re-ordered list of candidate motion information predictors based upon said computed statistics, said re-ordered list containing motion information predictors ordered in decreasing order of frequency of selection, said item of information being a current index indicating a position of said current motion information predictor in the re-ordered list;

the step of entropic encoding comprises binarizing said item of information, so as to obtain a list of binary elements representative of said item of information, and applying a context-dependent entropic encoding on at least the first binary element of said list of binary elements, a context used for entropic encoding being further dependent on the list re-ordering;

a context-dependent entropic encoding is applied on the first three binary elements of said list of binary elements;

the re-ordered list of candidate motion information predictors has an associated list-type and the context for entropic encoding a binary element further depends on said list-type;

the step of computing statistics representative of a frequency of selection of each motion information predictor of said list on a first portion of a current video sequence comprises computing an histogram of the number of times each index indicating a position in said list has been selected for said first portion of the current video sequence;

the computing of an histogram comprises a step of initializing said histogram with exponentially decreasing value.

According to a particular feature, the video stream is a multi-view video stream comprising at least two video sequences, each video sequence corresponding to a view of a scene, and the list of candidate motion information predictors for a current block of a current video sequence corresponding to a current view comprises at least one motion information predictor obtained from block of a video sequence corresponding to a view different from the current view.

According to a second aspect, the invention proposes a method of decoding a video stream comprising at least one video sequence, comprising, for the decoding of a square or rectangular block of a picture of a video sequence of the video stream, a step of entropic decoding of an index representative of a position of a motion information predictor in a list of candidate motion information predictors, said motion information predictor being a motion information predictor selected for said block.

The decoding method further comprises obtaining an information relative to computed statistics representative of a frequency of selection of each motion information predictor of said list on a first portion of a current video sequence, and, for a current block to decode of a second portion following said first portion of the current video sequence, entropic decoding of an item of information representative of a selected current motion information predictor for said current block, said item of information and/or said entropic decoding being dependent on said computed statistics.

The advantages of the decoding method are analogous to the advantages of the encoding method and are not reminded here.

According to a third aspect the invention proposes an encoder adapted to encode a video stream comprising at least one video sequence, comprising, for the encoding of a square or rectangular block of a picture of a video sequence of the video stream a selection unit for selecting a motion information predictor for said block from a list of candidate motion information predictors, and an entropic encoding unit for entropic encoding of an index representative of a position of the selected motion information predictor in said list.

The encoder further comprises a unit for computing statistics representative of a frequency of selection of each motion information predictor of said list on a first portion of a current video sequence, and, for a current block to encode of a second portion following said first portion of the current video sequence, a unit for selecting a current motion information predictor for said current block, and a unit for entropic encoding of an item of information representative of said selected current motion information predictor, said item of information and/or said entropic encoding being dependent on said computed statistics.

According to a fourth aspect the invention proposes a decoder adapted to decode a video stream comprising at least one video sequence, comprising, for the decoding of a square or rectangular block of a picture of a video sequence of the video stream, a unit for entropic decoding of an index representative of a position of a motion information predictor in a list of candidate motion information predictors, said motion information predictor being a motion information predictor selected for said block.

The decoder further comprises a unit for obtaining an information relative to computed statistics representative of a frequency of selection of each motion information predictor of said list on a first portion of a current video sequence, and, for a current block to decode of a second portion following said first portion of the current video sequence, a unit for entropic decoding of an item of information representative of a selected current motion information predictor for said current block, said item of information and/or said entropic decoding being dependent on said computed statistics.

According to a fifth aspect, the invention proposes a computer program product adapted to implement an encoding method as briefly described above.

According to a sixth aspect, the invention proposes a computer program product adapted to implement a decoding method as briefly described above.

The invention will be better understood in the light of the detailed description and accompanying drawings, which are only exemplary and by no way limiting.

DETAILED DESCRIPTION OF THE INVENTION

The invention will be described in the context of the multi-view coding extension of HEVC standard under development, in particular as described in the document ISO/IEC JTC1/SC29/WG11 MPEG2011/N12744, "Test Model under Consideration for HEVC based 3D video coding v3.0" of April 2012, but can more generally apply in motion information prediction for video coding.

As explained in the introduction, HEVC has an aim of further improving compression by reducing the bitrate of the motion information. In multi-view coding extension of HEVC, the inter-view redundancy between several views of a scene, shot simultaneously by image capture means such as video cameras, is further taken into account.

In HEVC, pictures of a video sequence are divided into a sequence of coding tree units (CTUs), which are split into coding units (CUs). A CTU consists of an m×m block of luminance samples, together with two corresponding blocks of chrominance samples for a picture having three sample arrays. A CU is a basic unit of region splitting, it is square and may take a size from 8×8 up to the size of the CTU.

The coding unit (CU) is the basic unit of region splitting used for intra and inter coding. Each CU may contain one or more prediction units (PU), depending on the partition mode. The prediction unit, which is a square or rectangular block of size varying from 4×4 to 64×64, is the basic unit used for carrying information related to prediction processes.

A prediction unit can be intra or inter coded. Several inter coding modes are defined, including a "skip" mode, a "merge" mode and an "inter" mode. In all inter coding modes, a PU shall have an associated motion information which is a list of motion parameters comprising a motion vector, a reference picture index and a reference picture list usage flag.

In the following, the basic unit used in the motion prediction process will be termed either block or prediction unit.

Figure 1:
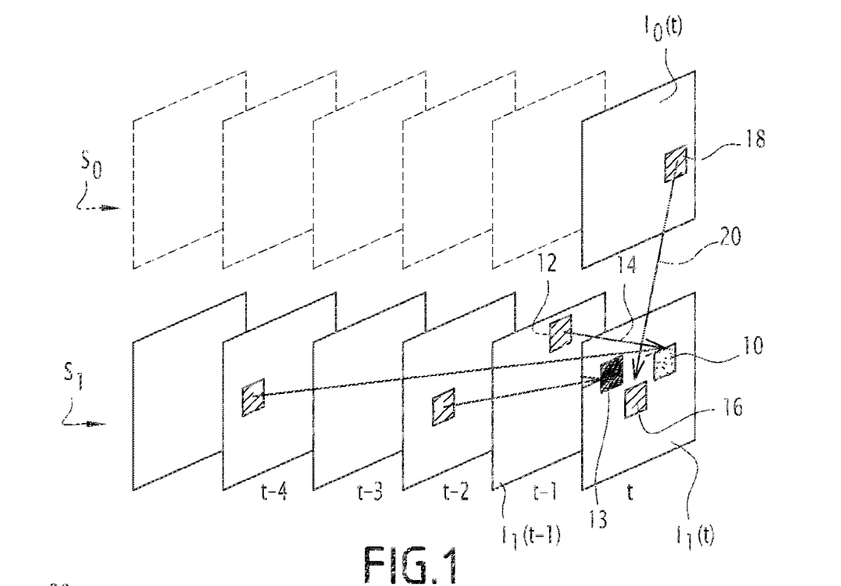
FIG. 1 schematically illustrates motion prediction in multi-view video coding.

FIG. 1 illustrates schematically motion prediction and compensation as envisaged in multi-view video coding. Two video sequences, S0 and S1, are illustrated in FIG. 1, each corresponding to a view of a scene, respectively S0 corresponds to a view V0 and S1 corresponds to a view V1. Each video sequence comprises a plurality of pictures $I_0$, $I_1$, which are taken at simultaneous temporal instants. The temporal motion prediction refers to the prediction of blocks of a current picture in a sequence Si from blocks of reference pictures, already encoded, of the same sequence Si. A forward prediction is illustrated in FIG. 1, using a list of pictures, called list 0 which contains pictures which have temporal indexes lower than the current picture. As an example, block 10 of current picture $I_1(t)$ is predicted from block 12 of picture $I_1(t-1)$ via motion vector 14, which is a temporal motion vector.

A prediction from a picture of another view, called inter-view prediction, has been added. For example, block 16 of picture $I_1(t)$ may be predicted from block 18 of $I_0(t)$ via the motion vector 20. Such an operation is referred to as disparity compensated prediction, and the motion vector 20 is referred to as a disparity motion vector.

Therefore, in multi-view video coding, a picture of a different view, of the same temporal index as the current picture, is added to the list of reference pictures to be used for motion prediction and motion compensation.

The example of FIG. 1 illustrates a case of multi-view coding with two views. The multi-view encoding is however not restricted to two views, an arbitrary number of views is considered. In such case, in one embodiment, only the closest view (in terms of proximity of the camera positioning) to the current view is used for disparity motion compensation. In an alternative embodiment, all the views already coded are used for disparity motion compensation.

Also, it shall be noted that in the representation of FIG. 1, square blocks have been used for motion compensation. As already explained, this is not restrictive, the blocks or prediction units used as coding units for motion prediction may be either square or rectangular shape.

Figure 2:
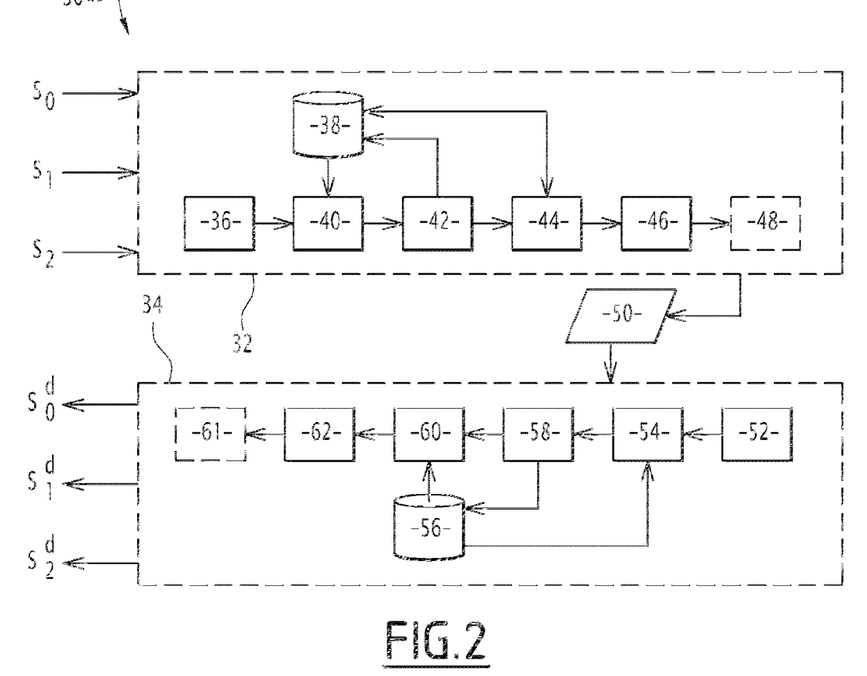
FIG. 2 is a block diagram of a multi-view encoding and decoding system.

FIG. 2 illustrates schematically a multi-view video encoder and a multi-view video decoder according to the invention. The illustration is partial, only the modules related to motion prediction are represented.

The system 30 comprises an encoder 32 and a decoder 34. The encoder 32 receives as an input a plurality of video sequences, referenced in this example S0, S1, S2, each representative of a respective view V0, V1, V2, of a scene. The encoder 32 comprises a module 36 of obtaining a current block $Bc(I_k(t))$ of picture $I_k(t)$ of Sk of view Vk to be encoded in an inter prediction mode. A block to be encoded using "skip" or "merge" mode is considered. The block $Bc(I_k(t))$ corresponds to a so-called prediction unit of HEVC and has a size comprises between 4×4 and 64×64.

Available information from already encoded pictures of the video stream is stored in memory 38. Such information comprises in particular motion and texture information related to the pictures of the sequence Sk of view Vk and also motion and texture information of picture $I_{k-1}(t)$ of a picture of same temporal index "t" of video sequence Sk−1 of view Vk−1, representative of a different view from the current view.

The encoder further comprises a module 40 adapted to implement means for determining a list of candidate motion information predictors for the current block.

The list is ordered according to a predetermined order and comprises motion parameters obtained from neighbouring blocks of the current block $Bc(I_k(t))$, which have already been encoded and are stored in memory 38. The neighbourhood considered comprises spatial, temporal and inter-view neighbours, as explained in more detail with respect to FIG. 3. For a given block, the motion information comprises, in a unidirectional prediction mode, a motion vector, a reference picture index and a reference picture usage flag. In bi-directional prediction mode, the motion information comprises a motion vector per prediction list, an associated reference picture index for each motion vector and a reference picture usage flag.

The encoder 32 further comprises a module 42 adapted to select a best candidate, according to a given distortion-rate criterion, for the current block to be encoded, from the list of motion information prediction candidates. An index representative of the position of the selected candidate in the list is temporarily stored in memory 38.

According to the invention, the encoder further comprises a module 44 for computing and/or updating statistics relative to the selected motion information predictors for already coded blocks of a given portion of the video sequence. For example, already encoded blocks of the current slice are considered, a slice being for example a rectangular portion of a picture that can be encoded and decoded independently.

In an embodiment, the statistics are computed as a histogram representing, the number of times each index, representative of the position of a selected motion information candidate in the list of motion information candidates, is actually selected as a predictor.

The computed statistics are further used in module 46 for adaptive entropic encoding of an item of information representative of motion information predictor selected for a current block to encode by module 42.

The item of information to encode is, according to a first embodiment described in further detail hereafter, an index of the selected motion information predictor for the current block representative of a position in a re-ordered list of motion information predictors, the re-ordered list being obtained from the initial list which is re-ordered according to the computed statistics.

Advantageously, the computation of statistics allows to locally adapt to the contents of the video sequences and to take better advantage of the redundancy brought by multi-view coding.

According to a second embodiment, the item of information is an index of the selected motion information predictor for the current block in the initial list of motion information predictors obtained by module 40, and module 46 applies a CABAC encoding (for "context-adaptive binary arithmetic encoding"), wherein, for one or several binary elements or bins composing the item of information to be encoded, a context model depending on the computed statistics is applied. Optionally, module 46 further encodes an information relative to the computed statistics used for encoding the current block, so as to inform the decoder of a type of list, for example a type or re-ordering, used at the encoder.

The encoder 32 also comprises a module 48 for texture residue encoding, which is used in "merge" mode.

In the "skip" mode, a HEVC coding unit is represented as a single prediction unit, and is encoded only via the motion information prediction. Therefore, only an index of the position of the motion information predictor in the list of motion information predictors candidates is encoded and transmitted to the decoder.

The encoder 32 outputs a compressed multi-view bitstream 50, which may be stored or transmitted by any suitable transmission means to the decoder 34.

The motion compensation tools of the decoder 34 comprise a module 52 adapted to extract the bitstream portion corresponding to a current block $Bc(I_k(t))$ to decode.

The module 54 of the decoder 34 is analogous to the module 40 of the encoder 32, and is adapted to implement means for determining a list of candidate motion information predictors for the current block to be decoded. The neighbouring blocks of the current block have already been decoded and stored in memory 56. Therefore, the decoder can apply the same process as the encoder to determine a list of candidate motion information predictors.

The decoder 34 also comprises a module 58 for obtaining information relative to a frequency of selection of motion information predictors for already decoded blocks, for example already decoded blocks belonging to the same slice as the current block to decode.

In an embodiment, the module 58 is analogous to module 44 of the encoder and implements a computation of statistics of frequency of occurrence of each decoded index.

In an alternative embodiment, the decoder receives an information relative to the computed statistics used at the encoder, therefore the module 58 decodes such a received information.

Next, module 60 applies entropic decoding so as to decode an index $i_c$ designating a position of a motion information predictor in a list of motion information predictors.

In a first embodiment, index $i_c$ is representative of a position in a re-ordered list of candidate motion information predictors, the re-ordering being carried out according to the information relative to the computed or received statistics obtained by module 58.

In a second embodiment, the information relative to the computed statistics obtained by module 58 is taken into account in the context model selection of the entropic decoding applied by module 60.

The decoded index obtained by module 60 is applied by next module 62 for selecting a motion information predictor for the current block in the list of candidate motion information predictors, which may be a re-ordered list.

The decoder further comprises a module 64 adapted to apply texture residue decoding, if necessary in the "merge" mode, so as to completely decode the current block.

As a result, the decoder outputs decoded video sequences $S_0^d, S_1^d, S_2^d$, corresponding to the views V0, V1, V2, which can be provided to a unit adapted to display them, for example for 3D visualization.

The modules of the encoder 32 and decoder 34 can be implemented in hardware, software codes or a combination of both, using a processor such as a central processing unit (CPU) of a computer, a microprocessor or a field programmable array (FPGA). Such a processor is configured to execute machine readable codes, in a programming language. In software, the invention is implemented as a computer program comprising a computer-readable storage medium having thereon instructions that, when executed, cause a processor of a device for encoding or decoding to execute the steps for encoding or decoding motion information prediction as explained in detail here below.

Figure 3:
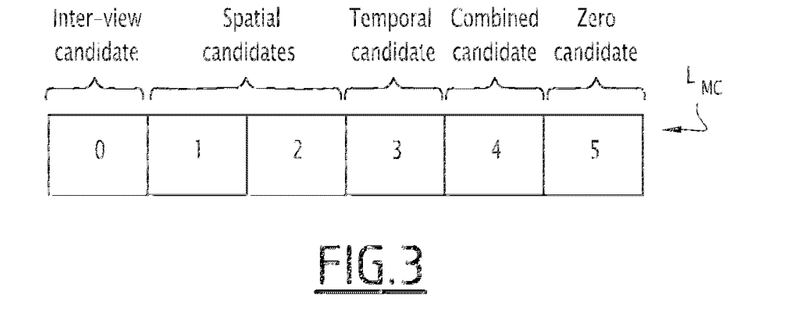
FIG. 3 illustrates schematically a list of motion information prediction candidates.

FIG. 3 illustrates a list $L_{MC}$ of motion information prediction candidates for a current block $Bc(I_k(t))$, which contains a maximum number of items which is predetermined, equal to 6 in an embodiment as specified in document ISO/IEC JTC1/Sc29/WG11 MPEG2011/N12744, "Test Model under Consideration for HEVC based 3D video coding v3.0" of April 2012, and the items are ordered according to a predetermined order.

The first candidate, which is positioned at index 0, is the inter-view candidate, i.e. the motion information associated to the disparity compensated block $B_{dp}$ of the picture $I_{k-1}(t)$ at the same temporal instant of the view $V_{k-1}$ previously encoded.

The candidates positioned at indexes 1 and 2 are spatial candidates, associated respectively to spatial neighbours of the current block $Bc(I_k(t))$, typically the blocks situated at the top and on the immediate left of the current block.

The candidate positioned at index 3 is a temporal candidate, referring to the motion information associated to the co-located (i.e. at the same spatial position) block in a previous reference picture of the same sequence is considered. For example, the motion information associated to the co-located block in the picture $I_k(t-1)$ is considered.

A candidate obtained from a combination of spatial and temporal candidates, as described in document "ITU-T SG16 WP3 and ISO/IEC JTC1/SC29/WG11/: JCTVC-11002", "HM7: High Efficiency Video Coding (HEVC) Test Model 7 Encoder Description", April 2012, is positioned at index 4 in the list.

Finally, a "zero" motion vector, meaning that the current block is predicted directly by its co-located block of the previous picture, is present in the list at index 5.

The list $L_{MC}$ of FIG. 3 is called initial list of candidates, and their order is expected to be a decreasing order of relevancy, that is to say that candidate of index 0 is the most likely to be selected as an actual predictor, and so on, and candidate of index 5 is the less likely to be selected.

However, such an assumption regarding relevancy is based on average statistics on a large number of video sequences, and is not adapted to particular cases.

According to a first embodiment of the invention, a dynamic re-ordering of the initial list of candidates $L_{MC}$ is proposed, based on statistics of frequency of selection computed on the fly, so as to ensure that the candidates of the re-ordered list $L'_{MC}$ of candidates are actually ordered according to an order of decreasing relevancy.

Figure 4:
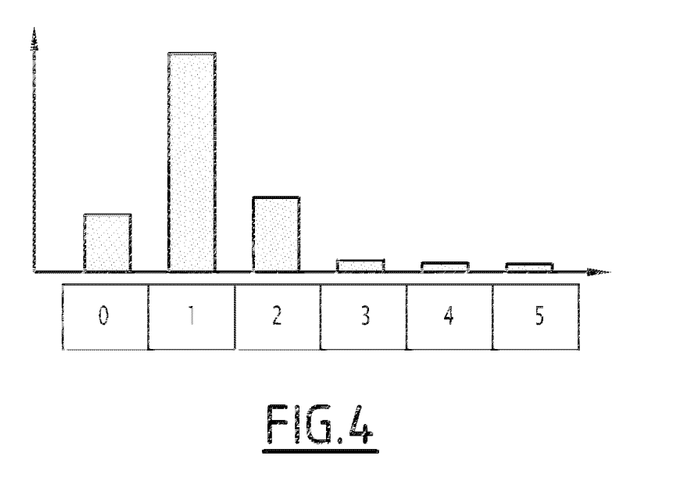
FIG. 4 illustrates an example of computed histogram representative of the frequency of selection of motion information predictors.

In an embodiment, the statistics are computed in the form of an histogram, as illustrated on FIG. 4, representing the number P of times each index of the initial list $L_{MC}$ is selected as an actual motion information predictor. Such a histogram may be simply stored as an array.

In the example of FIG. 4, the first spatial predictor of index 1 is the most frequently selected, followed by the second spatial predictor of index 2, and followed by the inter-view predictor of index 0.

Figure 5:
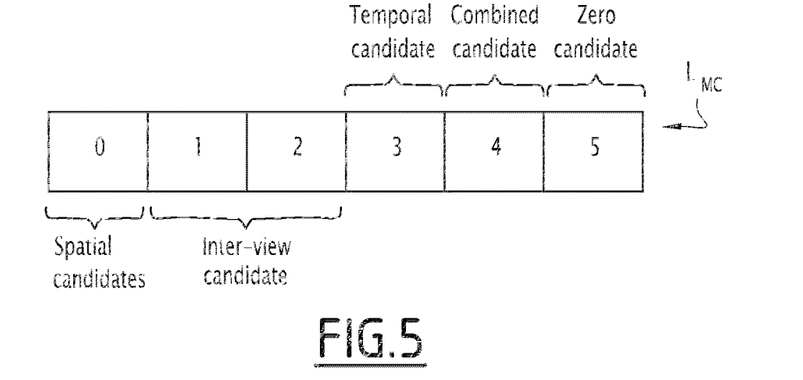
FIG. 5 illustrates schematically a re-ordered list of motion information prediction candidates.

A re-ordered list $L'_{MC}$ in which the candidates for motion information prediction are ordered according to the level of relevancy illustrated by the histogram of FIG. 4 is illustrated in FIG. 5. In the re-ordered list $L'_{MC}$, the first spatial candidate for motion information prediction is positioned at index 0, the second spatial candidate for motion information prediction at index 1 and the inter-view candidate for motion information prediction at index 3.

Figure 6:
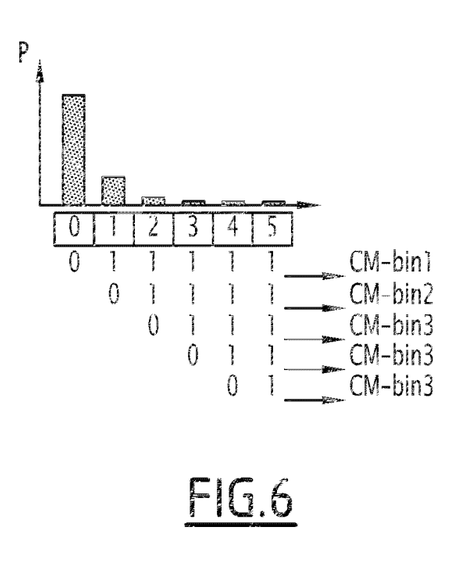
FIG. 6 represents a histogram of frequency of selection associated to the re-ordered list of FIG. 5.

The histogram of number of selections associated with the re-ordered list $L'_{MC}$ is illustrated in FIG. 6.

FIG. 6 also illustrates an example of binarization of each index to be encoded, i.e. index 0 is binarized as 0, index 1 as '10', index 2 as '110' and so on, according to unary encoding.

Each binarized index is composed of a number of binary elements or bins, the number of bins varying from one for index 0 to five for index 5.

In an embodiment, the first three bins are encoded using a context-dependent binary encoding, and the last two bins are encoded using a so-called by-pass encoding, in which the value of a bin to be encoded (either '0' or '1') is equiprobable, and does not depend on context.

In a preferred embodiment, several types of re-ordered lists of candidates for motion information prediction are considered. For example, the initial list as illustrated in FIG. 3 is called list of type A, the re-ordered list as illustrated in FIG. 5 is called list of type B and a list of type C wherein the candidates are ordered as {first spatial predictor candidate, inter-view candidate, second spatial predictor candidate, temporal candidate, combined candidate, zero candidate}. Considering several lists types, a list-type specific context-model is implemented for each bin to be encoded with an adaptive context-model.

Figure 7:
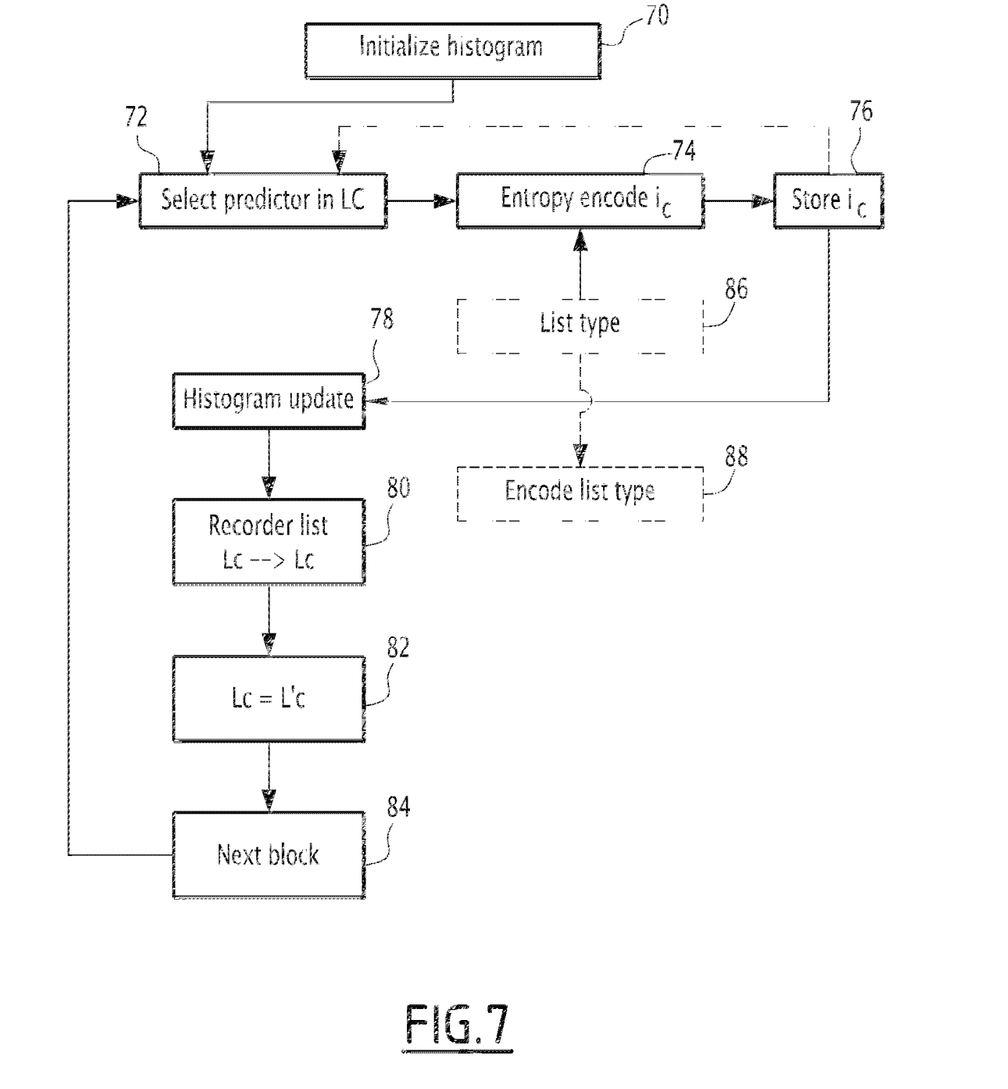
FIG. 7 is a flowchart of a method of adaptive encoding of motion information predictors according to an embodiment of the invention.

FIG. 7 is a flowchart of a method of encoding motion information prediction according to a first embodiment of the invention.

In a first step 70, an histogram for storing a number of times each index of a list of candidates for motion information prediction is selected. In practice, an histogram may be represented as a table comprising K items, K being the number of predictors comprised in a list of motion information predictors. In the example of FIG. 3, K=6.

Preferably, when the histogram computation is applied to a portion of a picture, as for example a slice of a picture of a video sequence, the histogram is not initialized with values equal to 0, but is initialized with arbitrary exponentially decreasing values, in order to avoid any re-ordering without statistically significant data accumulation. For example, the histogram is initialized with the values {32, 16, 8, 4, 2, 1}.

Next, in step 72, for a current block Bc of the current portion of picture to be encoded, a candidate for motion information prediction is selected, in the current list Lc of candidates, according to a rate-distortion criterion as explained in document "ITU-T SG16 WP3 and ISO/IEC JTC1/SC29/WG11/: JCTVC-I1002" "HM7: High Efficiency Video Coding (HEVC) Test Model 7 Encoder Description" of April 2012.

Initially, the list of candidates Lc is the initial list $L_{MC}$, as illustrated on FIG. 3, comprising motion information prediction candidates ordered according to an initial predetermined order.

The selected candidate for motion information prediction for the current block has an index $i_c$ in the list Lc.

The selected index $i_c$ is next encoded in step 74 using a context-dependent entropic encoding for one or several of the most significant bins of a binary representation of the selected index. The selected index $i_c$ is further memorized in step 76.

The steps 72 to 76 are iterated for successive blocks belonging to a first portion of a current picture. In a preferred embodiment, the first portion is a coding unit as defined in HEVC, termed CTU in HEVC.

In an alternative embodiment, the first portion consists in a single block to encode, in which case steps 72 to 76 are not iterated.

Next, a step 78 of histogram updating is implemented. The histogram initialized in step 70 is updated based on the indexes stored in step 76. Let the histogram be denoted H. For each index $i_c$ stored, the updating consists in incrementing $H[i_c]$ by one: $H[i_c] = H[i_c] + 1$.

Alternatively, the histogram updating is carried out for each current block, after the step 72 of selecting a predictor in the current list of predictors.

Next, a step 80 of re-ordering the current list of predictors is applied, the re-ordering being based on the histogram H as already explained above. A re-ordered list L'c is obtained. Each index of the re-ordered list corresponds to an initial index of the initial list $L_{MC}$, and can be deduced from the initial list $L_{MC}$ from a conversion table, which depends on the statistics computed.

Considering the example of re-ordered list of FIG. 5, index 0 of the re-ordered list corresponds to initial index 1, index 1 of the re-ordered list corresponds to index 2, index 2 of the re-ordered list corresponds to index 0, the other indexes being identical in the two lists.

The re-ordered list is considered as the current list (step 82), and therefore, for each next block (step 84) to be encoded of a second portion of the video following the first portion, an index representative of the position of the selected predictor for motion information in the re-ordered list is encoded in step 74, such an index being related to an initial index of the selected predictor in the initial list $L_{MC}$ via a conversion table. Step 84 is followed by step 72 already described.

In the first embodiment mentioned above with reference to FIG. 2, the entropic encoding step 74 applies a CABAC type encoding as specified in HEVC, in which a context-model is applied for encoding the first bin of each binarized index encoding, regardless of the type of list of candidate motion information predictors used (either initial list or a re-ordered list).

In a second embodiment, the entropic encoding step 74 further uses a list type 86, as illustrated with a dashed line on FIG. 7.

Optionally, a list-type which identifies the re-ordered list L'c among a set of possible re-ordered lists is encoded in a step 88 as a side-information for the current video portion to encode. For example, a flag indicating the re-ordered list type is sent along with an encoded portion of the video which may be a slice, a CTU or a CU as defined in HEVC.

Figure 8:
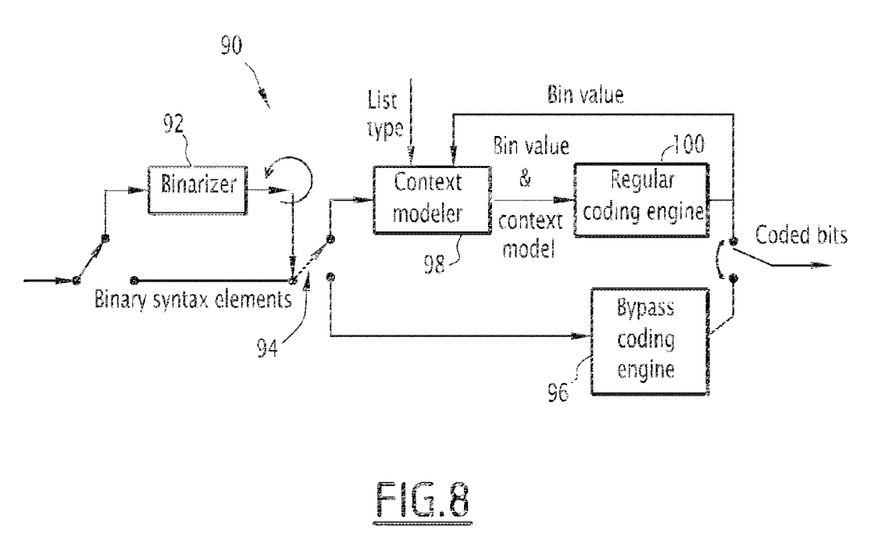
FIG. 8 is a block diagram illustrating context-adaptive entropic encoding.

FIG. 8 represents schematically a block diagram of a context-dependent entropic encoder as applied in the above mentioned second embodiment according to the invention.

The entropic encoder 90 receives as an input either binary syntax elements or non-binary syntax elements, the syntax elements being indexes representative of a position in a list of motion information predictors in this embodiment. A non binary syntax element is for example an index of a selected motion information predictor to be encoded.

A binarizer 92 using for example unary encoding, is applied to a non binary syntax element received to obtain a binary syntax element composed of binary elements or bins.

For each binary element, called bin, a selection of an encoding type, between context-adaptive encoding or non adaptive encoding, also called bypass encoding, is selected by a selector 94, represented as a switch. In general, at least the first bin which is the most significant bin of the binarized symbol is encoded using context-adaptive encoding.

However, several bins, for example the first three bins starting with the most significant bin, may be encoded using a context-adaptive encoder to further improve compression.

In case of selection of the non-adaptive encoding, a bypass coding engine 96, as described in the article "Context-Based Adaptive Binary Arithmetic Coding in the H.264/AVC Video Compression Standard", by D. Marpe, H. Schwarz and T. Wiegand, published in *IEEE Transactions on Circuits and Systems for Video Technology*, Vol. 13, No. 7, pp. 620-636 is applied.

For the bin or bins to be encoded using a context-adaptive encoder, a context-modeler 98 is applied. The context-modeler takes as an input the type of list of candidates for motion information prediction. A list-type dependent context model and the bin value to be encoded are transmitted to a regular CABAC coding engine 100. The bin value encoded is further used for updating the context model for the list-type used. Typically, the context-updating consists in updating a probability law associated with the list-type.

Experimental results have shown that using list-type dependent context modelling further improves compression. Indeed, the list-type is representative of local relevancy of the different motion information predictors. The item of information to be encoded is either representative of an inter-view motion predictor or a spatial motion predictor for example, and it appears useful to distinguish the context-adaptation for these different cases.

Finally, a set of coded bits corresponding to the input syntax element is output from the entropic encoder 90.

Figure 9:
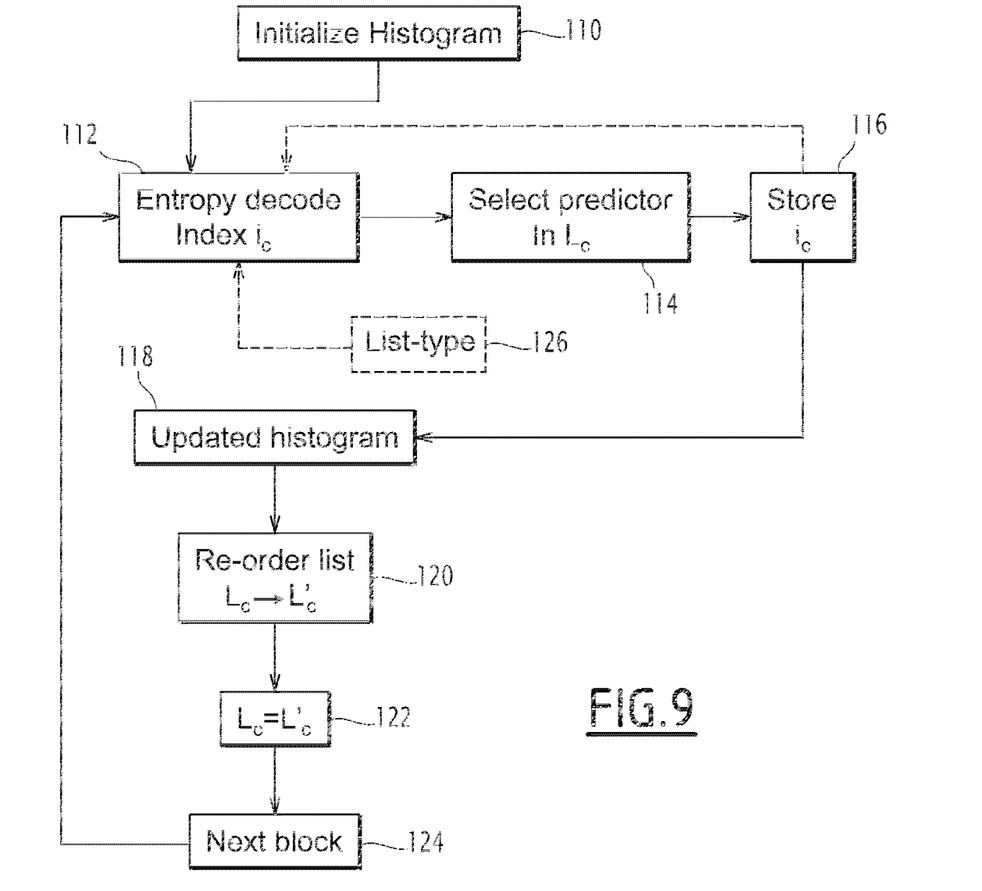
FIG. 9 is a flowchart of a method of decoding motion information prediction according to a first embodiment of the invention.

FIG. 9 is a flowchart of a method of decoding motion information prediction according to a first embodiment corresponding to the first embodiment of the method of encoding comprising a re-ordering of a list of candidates for motion estimation prediction.

Some steps of the decoding method are analogous to the steps of the encoding method described with respect to FIG. 7.

The first step 110 of histogram initializing is analogous to step 70. The same initialization values as the ones used at the encoder are also used at the decoder.

Next a step 112 of entropic decoding an index $i_c$ for a current block of the current portion of picture to be decoded is applied. A current list of candidate motion information predictors Lc is associated to the current block to decode, which is the initial list or a re-ordered list as described with respect to FIG. 3. Step 112 is followed by a step 114 of selection of the actual predictor indicated by the decoded index $i_c$ in the list Lc. The decoded index is stored in step 116, in view of histogram updating in step 118, analogous to step 78 implemented at the encoder. Similarly to what is implemented at the encoder, the updating is carried out after decoding all the blocks of a first portion of the picture to decode. The same first portion used at the encoder is also used at the decoder. In a preferred embodiment, the first portion is a coding unit termed CTU in HEVC.

After the histogram updating, a re-ordering of the list is applied in step 120, and the current list of candidates for motion information predictors is set to be the re-ordered list L'c of candidates in step 122. The next block to decode, belonging to a next portion of the video following the first portion processed is selected at step 124. Step 124 is followed by already described step 112.

In a second embodiment, when a list-type is used by the entropic encoder to encode an index of a selected motion information predictor, the entropic decoding step 112 also uses a list type 126. In this case, the initial list-type, at the start of a first portion to decode slice for example, is the type corresponding to the initial list as described with reference to FIG. 3. If a re-ordering occurs at step 120, the corresponding list type is stored to be used for the portion to decode following the first portion.

Figure 10:
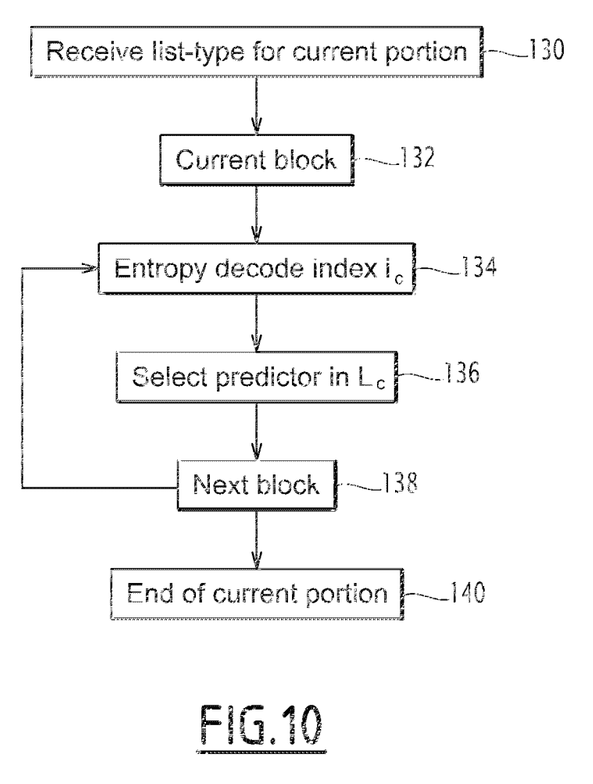
FIG. 10 is a flowchart of a method of decoding motion information prediction according to a second embodiment of the invention.

According to an alternative embodiment illustrated with respect to FIG. 10, if the encoder transmits a side-information representative of a list type relative to the list of candidates for motion information prediction, the steps implemented at the decoder are simplified. Indeed, in such a case the decoder does not need to compute a histogram, and does not need to actually apply a list-reordering according to a computed histogram.

In this alternative embodiment, the decoder only needs to store a conversion table making a correspondence, for each list Lc of each list type, between the initial indexes in the initial list $L_{MC}$ and the indexes of the list Lc.

If the list type is applied for the context-adaptive binary encoding/decoding, the list type information is further used in the context-adaptive binary decoding step.

For a current portion of a picture of a video sequence to decode, a list type is received and decoded at step 130.

Then for a current block of the current portion, selected at step 132, an entropic decoding is applied at step 134, to decode an index $i_c$ of the motion information predictor for the current block, the index $i_c$ referring to a position of a motion information prediction in a list Lc indicated by the received list type. Step 134 is followed by step 136 of selecting the motion information predictor for the current block situated at index $i_c$ of list Lc. A next block of the current portion is then considered (step 138) and steps 134 to 138 are repeated until the end of the current portion (step 140). The steps 130 to 140 are applied to a next portion of the video.

The invention is not limited by the exemplary embodiments described above, and comprises any variants that do not depart from its spirit. In particular, an embodiment of encoding or decoding an item of information representative of motion information predictors using computed statistics of the frequency of selection of motion information predictors for a video stream comprising a single video sequence is envisaged.

The invention claimed is:

1. A method for encoding a video stream comprising at least one video sequence, comprising, for the encoding of a square or rectangular block of a picture of a video sequence of the video stream:
   selecting a motion information predictor for said block from a list of candidate motion information predictors, and
   entropic encoding of an index representative of a position of the selected motion information predictor in said list, wherein the method further comprises:
   computing statistics representative of a frequency of selection of each motion information predictor of said list on a first portion of a current video sequence, for a current block to encode of a second portion following said first portion of the current video sequence, selecting a current motion information predictor for said current block, entropic encoding of an item of information representative of said selected current motion information predictor, at least one of said item of information and said entropic encoding being dependent on said computed statistics.

2. A method according to claim 1, wherein the method further comprises a step of re-ordering said list of candidate motion information predictors, called initial list, to obtain a re-ordered list of candidate motion information predictors based upon said computed statistics, said re-ordered list containing motion information predictors ordered in decreasing order of frequency of selection, said item of information being a current index indicating a position of said current motion information predictor in the re-ordered list.

3. A method according to claim 2, wherein the step of entropic encoding comprises:

binarizing said item of information, so as to obtain a list of binary elements representative of said item of information, applying a context-dependent entropic encoding on at least the first binary element of said list of binary elements, a context used for entropic encoding being further dependent on the list re-ordering.

4. A method according to claim 3, wherein a context-dependent entropic encoding is applied on the first three binary elements of said list of binary elements.

5. A method according to claim 3, wherein said re-ordered list of candidate motion information predictors has an associated list-type and wherein said context for entropic encoding a binary element further depends on said list-type.

6. A method according to claim 1, wherein said step of computing statistics representative of a frequency of selection of each motion information predictor of said list on a first portion of a current video sequence comprises computing an histogram of the number of times each index indicating a position in said list has been selected for said first portion of the current video sequence.

7. A method according to claim 6, wherein the computing of an histogram comprises a step of initializing said histogram with exponentially decreasing values.

8. A method according to claim 1, wherein said video stream is a multi-view video stream comprising at least two video sequences, each video sequence corresponding to a view of a scene, and wherein said list of candidate motion information predictors for a current block of a current video sequence corresponding to a current view comprises at least one motion information predictor obtained from block of a video sequence corresponding to a view different from the current view.

9. A method for decoding a video stream comprising at least one video sequence, comprising, for the decoding of a square or rectangular block of a picture of a video sequence of the video stream, a step of entropic decoding of an index representative of a position of a motion information predictor in a list of candidate motion information predictors, said motion information predictor being a motion information predictor selected for said block, wherein the method further comprises:

obtaining an information relative to computed statistics representative of a frequency of selection of each motion information predictor of said list on a first portion of a current video sequence, for a current block to decode of a second portion following said first portion of the current video sequence, entropic decoding of an item of information representative of a selected current motion information predictor for said current block, at least one of said item of information and said entropic decoding being dependent on said computed statistics.

10. A method according to claim 9, wherein said item of information is an index indicating a position of a current motion information predictor selected for the current block to decode in a re-ordered list obtained by re-ordering said list based upon said computed statistics, said re-ordered list containing motion information predictors ordered in decreasing order of frequency of selection.

11. A method according to claim 10, wherein said re-ordered list of candidate motion information predictors has an associated list-type and wherein the step of obtaining an information relative to computed statistics comprises receiving an information relative to said list-type.

12. A method according to claim 9, wherein step of obtaining an information relative to computed statistics comprises computing an histogram of the number of times each index indicating a position in said list has been selected for a block of said first portion of the current video sequence.

13. A method according to claim 12, wherein the computing of an histogram comprises a step of initializing said histogram with exponentially decreasing values.

14. A method according to claim 9, wherein the step of entropic decoding comprises applying a context-dependent entropic decoding of at least the first binary element of a set of binary elements representing said item of information, said context being further dependent on said computed statistics.

15. A method according to claim 9, wherein said video stream is a multi-view video stream comprising at least two video sequences, each video sequence corresponding to a view of a scene, and wherein said list of candidate motion information predictors for a current block of a current video sequence corresponding to a current view comprises at least one motion information predictor obtained from block of a video sequence corresponding to a view different from the current view.

16. An encoder adapted to encode a video stream comprising at least one video sequence, comprising, for the encoding of a square or rectangular block of a picture of a video sequence of the video stream:

a selection unit for selecting a motion information predictor for said block from a list of candidate motion information predictors, and an entropic encoding unit for entropic encoding of an index representative of a position of the selected motion information predictor in said list, wherein the encoder further comprises:

a unit for computing statistics representative of a frequency of selection of each motion information predictor of said list on a first portion of a current video sequence, for a current block to encode of a second portion following said first portion of the current video sequence, a unit for selecting a current motion information predictor for said current block, a unit for entropic encoding of an item of information representative of said selected current motion information predictor, at least one of said item of information and said entropic encoding being dependent on said computed statistics.

17. A decoder adapted to decode a video stream comprising at least one video sequence, comprising, for the decoding of a square or rectangular block of a picture of a video sequence of the video stream, a unit for entropic decoding of an index representative of a position of a motion information predictor in a list of candidate motion information predictors, said motion information predictor being a motion information predictor selected for said block,     wherein the decoder further comprises:
- a unit for obtaining an information relative to computed statistics representative of a frequency of selection of each motion information predictor of said list on a first portion of a current video sequence,
- for a current block to decode of a second portion following said first portion of the current video sequence,
- a unit for entropic decoding of an item of information representative of a selected current motion information predictor for said current block, at least one of said item of information and said entropic decoding being dependent on said computed statistics.

18. A computer program product stored on a computer-readable storage medium having thereon instructions that, when executed, cause a processor of a device for encoding a video stream comprising at least one video sequence, comprising, for the encoding of a square or rectangular block of a picture of a video sequence of the video stream selecting a motion information predictor for said block from a list of candidate motion information predictors, and entropic encoding of an index representative of a position of the selected motion information predictor in said list,
- to compute statistics representative of a frequency of selection of each motion information predictor of said list on a first portion of a current video sequence,
- for a current block to encode of a second portion following said first portion of the current video sequence,
- to select a current motion information predictor for said current block,
- to apply an entropic encoding of an item of information representative of said selected current motion information predictor, at least one of said item of information and said entropic encoding being dependent on said computed statistics.

19. A computer program product stored on a non-transitory computer-readable storage medium having thereon instructions that, when executed, cause a processor of a device for decoding a video stream comprising at least one video sequence, comprising, for the decoding of a square or rectangular block of a picture of a video sequence of the video stream, a step of entropic decoding of an index representative of a position of a motion information predictor in a list of candidate motion information predictors, said motion information predictor being a motion information predictor selected for said block,
- to obtain an information relative to computed statistics representative of a frequency of selection of each motion information predictor of said list on a first portion of a current video sequence,
- for a current block to decode of a second portion following said first portion of the current video sequence,
- to apply an entropic decoding of an item of information representative of a selected current motion information predictor for said current block, at least one of said item of information and said entropic decoding being dependent on said computed statistics.

\* \* \* \* \*